UNITED STATES PATENT OFFICE.

EMILE BLOCH-PIMENTEL, OF PARIS, FRANCE.

PURIFICATION OF CAUSTIC-ALKALI SOLUTIONS.

1,044,434. Specification of Letters Patent. Patented Nov. 12, 1912.

No Drawing. Application filed January 30, 1912. Serial No. 674,229.

*To all whom it may concern:*

Be it known that I, EMILE BLOCH-PIMENTEL, a citizen of the Republic of France, of 83 Boulevard de Sébastopol, Paris, in the Republic of France, have invented new and useful Improvements in the Purification of Caustic-Alkali Solutions, of which the following is a specification.

Cellulose, such as cotton, or wood-pulp, which is used as a raw material in certain industries, contains appreciable quantities of impurities consisting of imperfectly defined bodies, and in many cases, for instance, where the cellulose is to be used in the manufacture of artificial textiles, it is necessary to remove these impurities, particularly those which are derivatives of cellulose soluble in caustic alkali (hemicellulose, hydrocellulose, and the like), and the process hitherto usually employed for the purpose has been to treat the impure cellulose with caustic alkaline lye, which while purifying the cellulose, becomes rapidly charged with soluble cellulose products and is thereby rendered too impure for further use. Various methods have been suggested for purifying such impure caustic lyes, but such methods are costly and necessitate the use of expensive plants.

The object of the present invention is to provide a new and simple process for the purification of alkaline lyes containing in solution impurities such as those aforesaid.

The process is based on the fact that cellulose derivatives dissolved in alkaline lyes are precipitated by compounds of heavy metals, and it consists in treating such impure alkaline lyes with suitable compounds of heavy metals, particularly with compounds of copper which yield especially good results.

It is immaterial whether as a compound of copper, copper hydrate in soda or potash solution, or an ammoniacal solution of copper hydrate, or an ammoniacal solution of copper sulfate, or an aqueous solution of copper sulfate or of other salts of copper be used.

The soluble cellulose products which contaminate the alkali lye form a gelatinous precipitate with the compound of copper, or other heavy metal, which precipitate is then removed in the usual, or any suitable, way of separating precipitates from solutions and the alkaline lye is then free, or practically free, from cellulose products. The quantity of compound, of the heavy metal, to be used can be easily determined by a test experiment.

As an illustrative, but by no means limitative example, of the manner in which the invention may be carried out, a solution of purified celulose hydrate in caustic soda solution (10% NaOH) was mixed with a solution of copper hydrate also dissolved in caustic soda solution of the same strength. The precipitated copper was filtered off and the proportion of cellulose hydrate remaining in solution was estimated on the original weight of cellulose hydrate solution. Graphically illustrated the results of the example were as follows:—

|  | I. | II. |
|---|---|---|
| Cellulose hydrate in solution | .235 | .0 |
| Cellulose hydrate precipitated | .061 | .296 |
| Copper sulfate used | .026 | .130 |
| Ratio $\left\{\dfrac{CuSO_4}{\text{Cellulose hydrate precipitated}}\right\}$ | .42 | .44 |

The ratios above noted are far from controlling however, since it has been found that different classes of cellulose derivatives require different amounts of copper to precipitate them, the ratio in some cases going as high as .725. The amount of copper to be used varies under different conditions and must be determined by a test experiment, as above stated.

What I claim is:—

The process of purifying caustic alkali lye containing soluble cellulose compounds as impurities which consists in treating such alkaline lye with a compound of copper and then separating from the lye the precipitate formed.

In testimony whereof I have signed my name to this specification in the presence of two subscribing witnesses.

EMILE BLOCH-PIMENTEL.

Witnesses:
RAYMUND AUZENAT,
H. C. COXE.